Nov. 2, 1965 E. ERLBACH 3,215,862

SEMICONDUCTOR ELEMENT IN WHICH NEGATIVE RESISTANCE CHARACTERISTICS ARE PRODUCED THROUGHOUT THE BULK OF SAID ELEMENT

Filed Jan. 10, 1963

INVENTOR
ERICH ERLBACH

BY George Baron
ATTORNEY

United States Patent Office 3,215,862

Patented Nov. 2, 1965

3,215,862

SEMICONDUCTOR ELEMENT IN WHICH NEGATIVE RESISTANCE CHARACTERISTICS ARE PRODUCED THROUGHOUT THE BULK OF SAID ELEMENT

Erich Erlbach, New York, N.Y., assignor to International Business Machines Corporation, New York, N.Y., a corporation of New York Filed Jan. 10, 1963, Ser. No. 250,514
2 Claims. (Cl. 307—88.5)

This invention relates to the obtaining of a novel negative resistance element based on the properties of hot carriers in an anistropic band structure.

It has been known that the application of moderately strong electric fields to certain solids can cause currents to be produced in such solids that do not follow Ohm's law. That is, the currents produced by such electric fields are not simply proportional to the electric field as is the case for small fields and for metals. The charge carriers are accelerated by the electric field and consequently gain energy from this field. The rate of energy gain must equal the rate at which the carriers transfer this energy to the lattice, and for certain materials this can occur only if the average energy of the carriers is greater than their thermal energy at the lattice temperature. The field thus produces "hot electrons," namely, electrons whose energies are associated with temperatures that are higher than the lattice temperatures. If the rate of energy exchange between the carriers through mutual collisions is large compared with the rate of energy exchange between the carriers and lattice vibrations, the carriers are in thermal equilibrium amongst themselves, though displaced in momentum space, and at a temperature T which may be higher than the lattice temperature $T_0$.

Furthermore, it is known that for carriers whose constant energy surfaces consist of several ellipsoids (and not spheres), the application of these electric fields may cause unequal heating of the carriers in the various parts of the band, and also a redistribution of the equilibrium number of carriers in the various parts of the band. Thus previously equivalent valleys may no longer be equivalent after application of an electric field. This sometimes results in a situation in which the current density has a component both in the direction of the field and perpendicular to the field. However, the possibility of obtaining negative resistances from this effect has never been discussed nor appreciated.

Three of the many references to the production of hot electrons and the possible deviation of a current vector from its associated electric field vector are cited herein as background material for understanding the present invention; they are J. B. Gunn's article, "High Electric Field Effects in Semiconductors," appearing in Progress in Semiconductors, vol. 2, pg. 211 (1957); "Anisotropy of Hot Electrons in Germanium," by Saski et al. in the Journal of Physics and Chemistry of Solids, 1959, vol. 8, pp. 250–256, and "The Anisotropy of the Conductivity of Hot Electrons and Their Temperature in Germanium," by E. G. S. Paige appearing in the Proceedings of the Physical Society, vol. 75, 1960, pp. 174–184.

Employing the information incorporated by reference in the three publications cited above, an electric biasing field is applied in a particular direction of a semiconductor crystal causing electrons in each valley of the crystal to be accelerated. When under appropriate conditions, to be discussed later, a second electric field is applied along a perpendicular direction of the semiconductor crystal, the current flow in the second direction is found to be opposite to the impressed field, resulting in negative resistance. In some cases, it is necessary to apply compression to the crystal to enhance the effect or to help provide the proper initial conditions.

It is an object of this invention to obtain a novel negative resistance element.

It is yet another object to obtain such an element in which negative resistance characteristics are produced throughout the bulk of said semiconductive material.

It is a further object to obtain a negative resistance element based on the properties of hot carriers in an anisotropic band structure of a semiconductor.

The foregoing and other objects, features and advantages of the invention will be apparent from the following more particular description of a preferred embodiment of the invention, as illustrated in the accompanying drawings.

Figure 1:
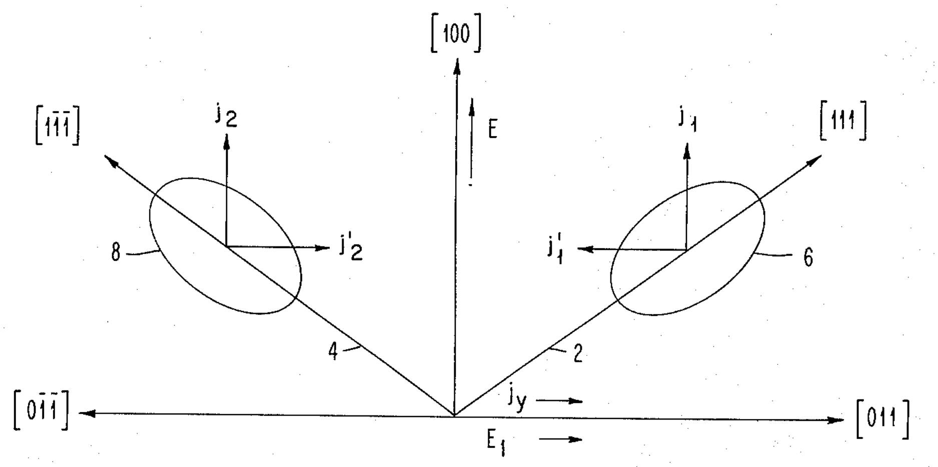
FIG. 1 shows two of the $\langle 111 \rangle$ valleys of the conduction band of germanium and is employed as an aid in the theoretical discussion of the invention.

FIG. 1 illustrates how electrons drift in response to an electric field applied along certain axes of the germanium crystal. In this figure there are shown two of the valleys in the $\langle 111 \rangle$ directions, represented by lines 2 and 4, of the conduction band of germanium. There are four such valleys for germanium, but only two are shown; the other two valleys lie in a plane perpendicular to the plane of the drawing shown in FIG. 1. If an electric field E is applied in a [100] direction (a bias field in the bias direction), electrons in each valley will produce a current in the direction of $$\underset{\approx}{\mu}\cdot\underset{\sim}{E}$$

where $$\underset{\approx}{\mu}$$

is the mobility tensor and $$\underset{\sim}{E}$$

is the electric field. As illustrated in FIG. 1, this will result in the presence of a component of current in each valley perpendicular to as well as parallel to $$\underset{\sim}{E}$$

Such perpendicular components are labelled $j_1'$ and $j_2'$. The sum of these transverse currents $j_1'$ and $j_2'$ is zero since contributions from the valleys are equal and opposite. This cancellation of transverse currents takes place only if the electrons in the appropriate valleys are equally "hot" and have an equal number of electrons, which occurs if the bias direction is one of the symmetry directions of the crystal.

The mobility tensor can usually be considered as composed of two parts. One part is the reciprocal mass tensor which is an inherent property of the particular crystal under consideration and does not vary with the electron temperature $T_e$ or the lattice temperature $T_l$, and the other part is a multiplicative factor $\mu$ which is the same for all components of the mobility tensor and varies both with $T_e$ and $T_l$. If $T_l$ is held constant (by immersion in a constant temperature bath such as liquid nitrogen) then the mobility is a function only of the electron temperature $T_e$. The electron temperature, in turn, is a function of the power delivered per electron by the electric field and is thus proportional to $$\underset{\sim}{E}\cdot\underset{\approx}{\mu}\cdot\underset{\sim}{E}$$

This quantity can be expressed as follows:

$$\underset{\sim}{E}\cdot\underset{\approx}{\mu}\cdot\underset{\sim}{E}=\sum_{i,\,j=z,\,y,\,z} E_i\mu_{ij}E_j=\sum_{i=x,\,y,\,z} E_i\cdot v_i$$

where $$v_x=\mu_{xx}E_x+\mu_{xy}E_y+\mu_{xz}E_z$$
$$v_y=\mu_{yx}E_x+\mu_{yy}E_y+\mu_{yz}E_z$$
$$v_z=\mu_{zx}E_x+\mu_{zy}E_y+\mu_{zz}E_z$$

It is seen from these equations that each velocity component is the sum of terms due to the component of E in all three directions.

If, as we have assumed in FIG. 1, the electric field is in the [100] direction, then $$\underset{\sim}{E}\cdot\underset{\approx}{\mu}\cdot\underset{\sim}{E}$$

is the same for electrons in all four valleys (and in particular for the two valleys illustrated in the figure). Therefore $T_e$ and thus $\mu$ is equal for all the electrons and there will also be equal numbers of electrons in each valley. This is why the transverse currents $j_1'$ and $j_2'$ are equal and therefore cancel.

However, if an additional field, $E_1$, is impressed in the [011] direction, $$\underset{\sim}{E}\cdot\underset{\approx}{\mu}\cdot\underset{\sim}{E}$$

and thus $T_e$, will no longer be equal for all valleys. For valley 6, the power will be reduced while for valley 8 it will be increased. This will cause a change in $\mu$ (the multiplicative constant in the mobility tensor) and thus change $j_1'$ and $j_2'$ unequally. Furthermore, if one valley is hotter than another, electrons will tend to transfer from the hot to the cold valleys thus further changing $j_1'$ and $j_2'$. There are thus three causes of current $j_y$ in the [011] direction, namely:

(a) The acceleration of the electrons by the field $E_1$ causing a $j_{ya}$ in the [011] direction;

(b) The incomplete cancellation of $j_1'$ and $j_2'$ due to the change in $\mu$ which will result in a $j_{yb}$ in the $[0\bar{1}\bar{1}]$ direction if $\mu$ decreases as $T_e$ increases (as is usually the case); and (c) the incomplete cancellation of $j_1'$ and $j_2'$ due to the change in the relative population of the valleys will result in a net $j_{yc}$ which is also in the $[0\bar{1}\bar{1}]$ direction if the direction of electron transfer is from hot to cold valley (as is usual).

The total curent $j_y$ responsive to the second field $E_1$ will be directed in the [011] direction or in the $[0\bar{1}\bar{1}]$ direction depending on whether or not the current caused by (a) dominates over the sum caused by (b) and (c). When $j_{ya}$ dominates $j_{yb}+j_{yc}$, $j_y$ is in the direction of $E_1$. If $j_{yb}+j_{yc}$ exceeds $j_{ya}$, then the current $j_y$ is directed toward $[0\bar{1}\bar{1}]$ which is opposite to the field $E_1$, resulting in a negative resistance characteristic.

It should be remarked that:

(a) If only the two valleys pictured are present, then the biasing field could equally well be in the [011] direction and the negative resistance in the [100] direction, i.e., the directions could be interchanged.

(b) For the case illustrated, the remaining two valleys contribute only to $j_{ya}$ and not to $j_{yb}$ or $j_{yc}$. The electrons in these valleys thus make attainment of a negative resistance region more difficult and it would be prudent, and in some cases essential, to remove the electrons from these valleys. Two suggested methods for accomplishing this are as follows:

(1) The application of uniaxial stress to the crystal. It is well known that uniaxial stress in appropriate directions alters the band structure of many crystals. In the case of n-germanium which we have used as an illustration previously, the application of uniaxial stress in the [011] direction will cause an increase in the energy of electrons in the valleys in the (011) plane thus causing a depopulation of these valleys in favor of the lower energy valleys in the $(00\bar{1})$ plane. It will be realized that this is just the sort of effect we require.

Figure 2:
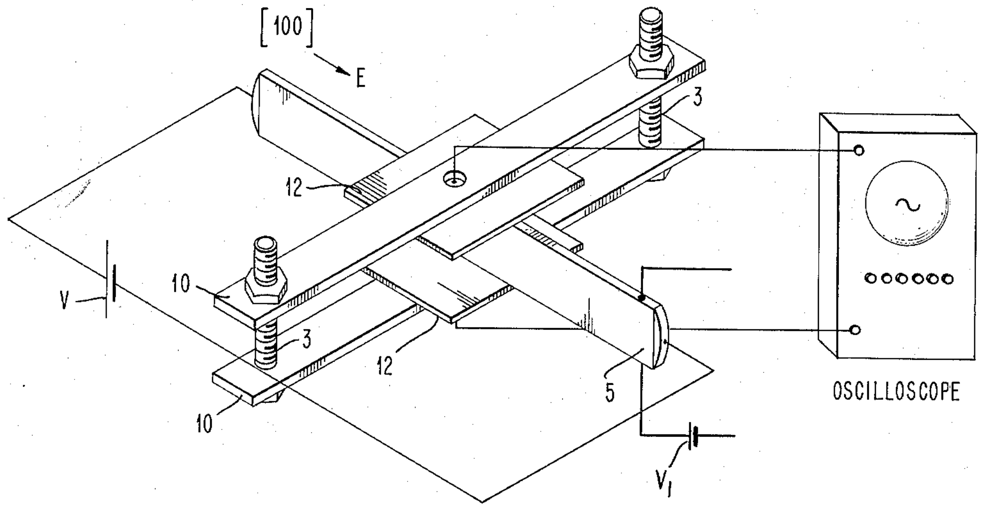
FIG. 2 is a particular embodiment of the invention employed in a simple circuit.

A simple example of how negative resistance is obtained with this method is illustrated in FIG. 2. A biasing electric field E is applied in the [100] direction by the source of voltage V. Uniaxial stress is applied in the [011] direction by tightening the insulating screws 3 in the bars 10 which are insulated from the n-germanium crystal 5 by thin ½ mil Mylar sheets 12. The bars can be used as A.C. contacts to couple capacitatively to the negative resistance present in the [110] direction under appropriate bias voltage conditions and under sufficient stress. The negative resistance characteristics are observable on an oscilloscope. The assembly can also be used inside of a coaxial cable or a wave guide. Naturally, a different means of applying pressure can also be employed.

(2) By choosing the direction of the biasing field properly, and employing a voltage source $V_1$, as shown in FIGURE 2, one can use its heating effect to bring the electrons in the valleys in the (011) plane to a higher temperature and thus to depopulate these valleys. Thus, if the biasing field direction is chosen as [011], then $$\underset{\sim}{E}\cdot\underset{\approx}{\mu}\cdot\underset{\sim}{E}$$

will be greatest for the valleys in the (011) plane and the electrons in these valleys will transfer to the lower energy valleys in the $(01\bar{1})$ plane as desired. For this orientation, it may be possible to attain the proper biasing without the use of stress. However, by applying pressure in the same [011] direction in which the bias field is applied, one would be able to enhance the effect and to operate at lower biasing voltages.

(c) The effect is naturally not necessarily restricted to n-germanium. Other materials may be satisfactory if they satisfy the following conditions:

(1) The material must have a band structure for the majority carrier consisting of several valleys;

(2) The constant energy surfaces must be ellipses preferably with a large ellipticity. It is more favorable if the transverse mass is greater than the longitudinal mass; any admixture of valleys with spherical energy surface is undesirable, though not necessarily disastrous;

(3) The material must exhibit "hot electron" effects such that the product of the mobility and intervalley relaxation time *decreases* as the power applied by way of an electric field to the electrons is increased;

(4) The material should not have too many carriers because of the large power required to heat the electrons.

Materials such as n-type silicon, $Bi_3Se_2$, $Bi_3Te_2$ and semiconducting alloys of bismuth and antimony are known to satisfy conditions (1), (2) and (4). Therefore the latter substitutes for n-germanium may be satisfactory. Naturally, the directions used in the illustration for n-type germanium would have to be altered for each material.

What is claimed is:

1. Means for obtaining bulk negative resistance characteristics for an n-type germanium crystal, the latter having four multi-valley conduction bands whose constant energy surfaces are ellipsoids having large ellipticities, means for applying uniaxial mechanical stress to said crystal along the [011] axis so as to nullify the intervalley transfer of electrons of two of said conduction bands but to enhance the intervalley transfer of electrons between the other two valleys, means for applying a biasing electric field along the [100] axis of said crystal, whereby negative resistance characteristics are obtained along the [011] axis of said crystal.

2. Means for obtaining bulk negative resistance characteristic for an n-type germanium crystal, the latter having four multi-valley conduction bands whose constant energy surfaces for ellipsoids having large ellipticities, means for applying uniaxial mechanical stress to said crystal along the [011] axis so as to nullify the intervalley transfer of electrons of two of said conduction bands but to enhance the intervalley transfer of electrons between the other two valleys, means for applying a biasing electrical field along the stressed axis, and means for applying an electrical field along the [100] axis during the presence of such stress and bias field so as to obtain negative resistance characteristics throughout the bulk of said crystal along said [100] axis.

References Cited by the Examiner

UNITED STATES PATENTS

| | | | |
|---|---|---|---|
| 2,909,679 | 10/59 | Abraham | 307—88.5 |
| 3,011,070 | 11/61 | Glicksman | 307—88.5 |
| 3,050,643 | 8/62 | Connell et al. | 307—88.5 |

OTHER REFERENCES

Proceedings of The Physical Society: "The Possibility of Negative Resistance Effects in Semiconductors" by Ridley and Watkins, vol. LXXVIII, pages 293–304, date manuscript received—Jan. 22, 1961.

ARTHUR GAUSS, *Primary Examiner.*